(12) United States Patent
Zeng et al.

(10) Patent No.: US 11,120,357 B2
(45) Date of Patent: Sep. 14, 2021

(54) QUANTUM APPROXIMATE OPTIMIZATION

(71) Applicant: Rigetti & Co., Inc., Berkeley, CA (US)

(72) Inventors: William J. Zeng, Berkeley, CA (US); Nicholas C. Rubin, Berkeley, CA (US); Matthew J. Reagor, Corte Madera, CA (US); Michael Justin Gerchick Scheer, Oakland, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 847 days.

(21) Appl. No.: 15/914,662

(22) Filed: Mar. 7, 2018

(65) Prior Publication Data
US 2018/0260731 A1 Sep. 13, 2018

Related U.S. Application Data

(60) Provisional application No. 62/469,877, filed on Mar. 10, 2017.

(51) Int. Cl.
*G06N 10/00* (2019.01)
*G06F 15/82* (2006.01)
(Continued)

(52) U.S. Cl.
CPC ............. *G06N 10/00* (2019.01); *G06F 15/76* (2013.01); *G06F 15/82* (2013.01); *G06F 17/17* (2013.01)

(58) Field of Classification Search
None
See application file for complete search history.

(56) References Cited

U.S. PATENT DOCUMENTS 7,788,192 B2 * 8/2010 Amin ...................... G06N 10/00
706/13
8,244,650 B2 * 8/2012 Rose ....................... G06N 10/00
706/13
(Continued)

FOREIGN PATENT DOCUMENTS

WO     2018/089792     5/2018

OTHER PUBLICATIONS

Haribara, Yoshitaka, etal., A Coherent Ising Machine MAX-CUT Problems: Performance Evaluation against Semidefininte Programming and Simulated Annealing, 2016, Springer Japan, 12 pages. (Year: 2016).*

(Continued)

*Primary Examiner* — Eric Coleman
(74) *Attorney, Agent, or Firm* — Henry Patent Law Firm PLLC

(57) ABSTRACT

In a general aspect, a computing system is configured to execute a quantum approximate optimization algorithm. In some aspects, a control system identifies a pair of qubit devices in a quantum processor. The quantum processor includes a connection that provides coupling between the pair of qubit devices. ZZ coupling between the pair of qubit devices is activated to execute a cost function defined in the quantum approximate optimization algorithm. The cost function is associated with a maximum cut problem, and the ZZ coupling is activated by allowing the pair of qubits to evolve under a natural Hamiltonian for a time period τ. One or more of the pair of qubit devices is measured to obtain an output from an execution of the quantum approximate optimization algorithm.

24 Claims, 7 Drawing Sheets

(51) Int. Cl.
G06F 17/17 (2006.01)
G06F 15/76 (2006.01)

(56) References Cited

U.S. PATENT DOCUMENTS

| | | | | |
|---|---|---|---|---|
| 10,074,792 | B1* | 9/2018 | Ferguson | G06N 10/00 |
| 10,417,574 | B2* | 9/2019 | Babbush | G06N 10/00 |
| 10,467,544 | B2* | 11/2019 | Filipp | G06F 15/82 |
| 10,832,155 | B2* | 11/2020 | Lechner | G06N 10/00 |
| 10,846,366 | B1 | 11/2020 | Otterbach et al. | |
| 2004/0119061 | A1† | 6/2004 | Wu et al. | |
| 2015/0032994 | A1* | 1/2015 | Chudak | G06N 10/00 712/42 |
| 2016/0012346 | A1† | 1/2016 | Biamonte et al. | |
| 2016/0062951 | A1† | 3/2016 | Yoshimura et al. | |
| 2017/0017894 | A1* | 1/2017 | Lanting | G06N 10/00 |
| 2017/0330101 | A1† | 11/2017 | Hastings et al. | |
| 2018/0260245 | A1 | 9/2018 | Smith | |
| 2018/0365585 | A1 | 12/2018 | Smith et al. | |
| 2019/0354897 | A1 | 11/2019 | Horesh et al. | |
| 2019/0384597 | A1 | 12/2019 | Horesh et al. | |
| 2020/0019879 | A1 | 1/2020 | Xue et al. | |

OTHER PUBLICATIONS

Harris, R. etal., Experimental Investigation of the eight-qubit unit cell in a superconducting optimization processor, 2010. Physical Review, 15 pages. (Year: 2010).*
Pinto, R.A., etal., Analysis of a tunable coupler for a superconducting phase qubits, 2010, Physical Review, 11 pages. (Year: 2010).*
USPTO, Notice of Allowance dated Mar. 27, 2020, in U.S. Appl. No. 16/217,410, 9 pgs.
Aharonov, et al., "Fault-Tolerant Quantum Computation with Constant Error Rate", SIAM Journal of Computing 38(4), Jul. 2008, 76 pgs.
Alidaee, "0-1 Quadratic programming approach for optimum solutions of two scheduling problems", Int. J. Systems Sci. 25(2), 1994, 8 pgs.
Aliferis, et al., "Quantum Accuracy Threshold for Concatenated Distance-3 Codes", Quantum Information and Computation 6(2), 2006, 69 pgs.
Ausiello, et al., "Complexity and Approximation: Combinatorial Optimization Problems and Their Approximability Properties", Springer-Verlag Berlin Heidelberg, 1999, 533 pgs.
Bergstra, et al., "Random Search for Hyper-Parameter Optimization", J. Machine Learning Research 13, Feb. 2012, 25 pgs.
Blais, et al., "Cavity quantum electrodynamics for superconducting electrical circuits: an architecture for quantum computation", Phys. Rev. A, vol. 69, 062320, American Physical Society; Ridge, NY; US, 2004, 14 pgs.
Blais, Alexandre, et al., "Quantum-information processing with circuit quantum electrodynamics", Physical Review A 75, 032329 (2007), Mar. 22, 2007, 21 pgs.
Blitzstein, et al., "Introduction to Probability", CRC Press, 2015, 572 pgs.
Boriah, et al., "Similarity Measures for Categorical Data: A Comparative Evaluation", Proceedings of the 2008 SIAM Int'l Conf on Data Mining:, 2008, 12 pgs.
Caldwell, et al., "Parametrically-Activated Entangling Gates Using Transmon Qubits", arXiv:1706.06562v1, Jun. 20, 2017, 6 pgs.
Das, et al., "Colloquium: Quantum annealing and analog quantum computation", Review of Modem Physics 80(3), Sep. 5, 2008, 21 pgs.
Didier, et al., "Analytical modeling of parametrically-modulated transmon qubits", arXiv:1706.06566v1, Jun. 20, 2017, 10 pgs.
Farhi, et al., "A Quantum Approximate Optimization Algorithm", arXiv:1411.4028v1, Nov. 14, 2014, 16 pgs.
Gallo, et al., "Quadratic Knapsack Problems", Mathematical Programming 12, 1980, 18 pgs.
Jain, et al., "Algorithms for Clustering Data", Prentice-Hall, Inc., 1988, 330 pgs.
Jain, et al., "Data Clustering: A Review", ACM Computing Surveys 31(3), 1999, 60 pgs.
Karp, "Reducibility Among Combinatorial Problems", Complexity of Computer Computations, 1972, 19 pgs.
Kim, et al., "Robust entanglement renormalization on a noisy quantum computer", arXiv:1711.07500v1, Nov. 20, 2017, 17 pgs.
Knill, et al., "Resilient Quantum Computation", Science 279(5349), 1998, 4 pgs.
Koch, Jens, et al., "Charge-insensitive qubit design derived from the Cooper pair box", Physical Review A 76, 042319, Oct. 12, 2007, 19 pages.
Kochenberger, et al., "The unconstrained binary quadratic programming problem: a survey", J. Combinatorial Optimization 28, Apr. 18, 2014, 24 pgs.
Krarup, et al., "Computer-Aided Layout Design", Mathematical Programming in Use, 1978, 20 pgs.
Lucas, "Ising formulations of many NP problems", arXiv:1302.5843v3, Jan. 24, 2014, 27 pgs.
Magesan, et al., "Scalable and Robust Randomized Benchmarking of Quantum Processes", Physical Review Letters 106, 180504, May 2011, 4 pgs.
McClean, et al., "The theory of variational hybrid quantum-classical algorithms", New J. Phys. 18 (2016)023023, Feb. 5, 2016, 23 pgs.
Neven, et al., "Image recognition with an adiabatic quantum computer", arXiv:0804.4457v1, Apr. 28, 2008, 7 pgs.
Nielsen, et al., "Quantum Computation and Quantum Information", Cambridge Univ. Press, 2010, 704 pgs.
Otterbach, "Unsupervised Machine Learning on a Hybrid Quantum Computer", arXiv:1712.05771v1, Dec. 15, 2017, 17 pgs.
Peruzzo, Alberto, et al., "A Variational Eigenvalue Solver on a Photonic Quantum Processor", Nature Communications, DOI: 10.1038/ncomms5213, Jul. 23, 2014.
Poljak, et al., "Maximum Cuts and Large Bipartite Subgraphs", Combinatorial Optimization: 181-244 /DIMACS Series in Discrete Mathematics and Theoretical Computer Science, 1995, 65 pgs.
Rasmussen, et al., "Gaussian Processes for Machine Learning", MIT Press, 2006, 266 pgs.
Reagor, et al., "Demonstration of Universal Parametric Entangling Gates on a Multi-Qubit Lattice", arXiv:1706.06570v2 [quant-ph], Jul. 13, 2017, 7 pgs.
Shahriari, et al., "Taking the Human Out of the Loop: A Review of Bayesian Optimization", Proceedings of the IEEE 104(1), Jan. 2016, 28 pgs.
Shirkhorshidi, et al., "A Comparison Study on Similarity and Dissimilarity Measures in Clustering Continuous Data", PLOS ONE 10(12): e0144059, Dec. 11, 2015, 20 pgs.
Shor, "Algorithms for Quantum Computation: Discrete Logarithms and Factoring", Proceedings of the 35th Conf. on Foundations of Computer Science, 1994, 11 pgs.
Shor, "Fault-Tolerant Quantum Computation", Proceedings of the 37th Conf. on Foundations of Computer Science, 1996, 10 pgs.
Smith, Robert S, et al., "A Practical Quantum Instruction Set Architecture", arXiv:1608.03355v1 [quant-ph], Aug. 11, 2016, 14 pages.
Smolin, et al., "Oversimplifying quantum factoring", Nature 499(7457), Jul. 11, 2013, 3 pgs.
Snoek, et al., "Practical Bayesian Optimization of Machine Learning Algorithms", Proceedings of the 25th Intl Conf on Neural Info Processing Systems, 2012, 9 pgs.
Snoek, et al., "Scalable Bayesian Optimization Using Deep Neural Networks", Proceedings of Machine Learning Research 37, 2015, 10 pgs.
Vahidpour, et al., "Superconducting Through-Silicon Vias for Quantum Integrated Circuits", arXiv:1708.02226v1 [physics.app-ph], Aug. 7, 2017, 5 pgs.
Vion, et al., "Manipulating the Quantum State of an Electrical Circuit", Science 296, 886, 2002, 5 pgs.
Wang, et al., "The Quantum Approximation Optimization Algorithm for MaxCut: A Fermionic View", 2017, 13 pgs.

(56) References Cited

OTHER PUBLICATIONS

Zeng, "Quantum Approximate Optimization on a Gate-model Superconducting Processor", APS March Meeting, Mar. 15, 2017, 37 pgs.

Rigetti Computing; Pyquil; https://web.archive.org/web/20171129090055/https://github.com/rigetticomputing/pyquil; Nov. 29, 2017; 3 pgs.

Forest beta; An API for Quantum Computing in the Cloud; https://web.archive.org/web/20171109163658/http://www.rigetti.com/forest; Nov. 9, 2017; 4 pgs.

Nogueira; Bayesian-optimization; https://web.archive.org/web/20170630225221/https://github.com/fmfn/BayesianOptimization; Jun. 30, 2017; 4 pgs.

Farhi, E., et al., "A Quantum Approximate Optimization Algorithm", arXiv:1411.4028v1 [quant-ph], Nov. 14, 2014, 16 pages.

Farhi, E., et al., "A Quantum Approximate Optimization Algorithm Applied to a Bounded Occurrence Constraint Problem", arXiv:1412.6062v2 [quant-ph], Jun. 25, 2015, 13 pages.

Farhi, E., et al., "Quantum Supremacy through the Quantum Approximate Optimization Algorithm", arXiv:1602.07674v1 [quant-ph], Feb. 24, 2016, 22 pages.

Guerreschi, et al., ""Practical Optimization for Hybrid Quantum-Classical Algorithms"", arXiv:1701.01450v1 [quant-ph], Jan. 5, 2017, 25 pgs.

Hen, I., et al., "Driver Hamiltonians for Constrained Optimization in Quantum Annealing", Phys. Rev. A 93, 062312, arXiv:1602.07942v2, Jul. 7, 2016, 9 pages.

Moll, et al., ""Quantum optimization using variational algorithms on near-term quantum devices"", arXiv:1710.01022v2 [quant-ph], Oct. 9, 2017, 30 pgs.

Reagor, Matthew James, "Superconducting Cavities for Circuit Quantum Electrodynamics", Dissertation, Yale University, Dec. 2015, 220 pgs.

Yuriy Makhlin, Quantum state engineering with Josephson-junction devices, Nov. 15, 2000, Reviews of Modern Physics.†

\* cited by examiner
† cited by third party

QUANTUM APPROXIMATE OPTIMIZATION

CROSS-REFERENCE TO RELATED APPLICATIONS

This application claims priority to U.S. Provisional Application No. 62/469,877 entitled "Quantum Approximate Optimization" and filed Mar. 10, 2017 which is hereby incorporated by reference.

BACKGROUND

The following description relates to quantum approximate optimization.

Quantum computers can perform computational tasks by executing quantum algorithms. Quantum algorithms are often expressed in terms of quantum logic operations applied to qubits. A variety of physical systems have been proposed as quantum computing systems. Examples include superconducting circuits, trapped ions, spin systems and others.

DETAILED DESCRIPTION

Figure 1:
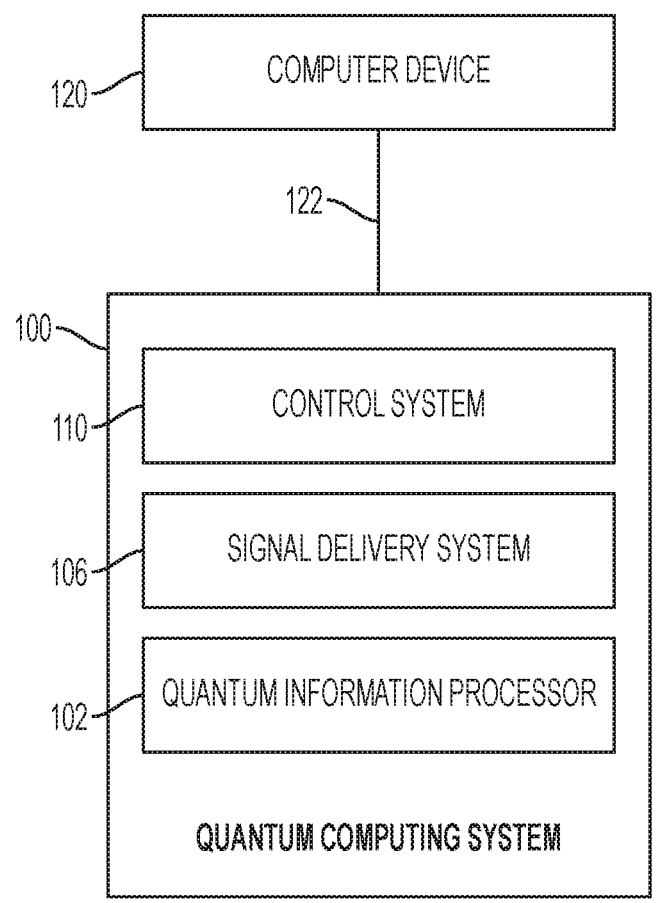
FIG. 1 is a bock diagram of an example quantum computing system.

In some aspects of what is described, a computing system can execute a quantum approximate optimization algorithm (QAOA). The computing system can include hardware that is programmed for a certain problem or class of problems that can be encoded in the cost function of the QAOA. For example, the computing system may include quantum processor hardware configured to provide qubit interactions that match the cost function of the QAOA. In some of the examples described here, a quantum processor includes special purpose logic circuitry that can efficiently execute quantum logic operations of a QAOA, for example, quantum logic operations corresponding to the cost function associated with the maximum cut problem. For instance, the quantum processor can be designed such that a graph structure and cost function of a maximum cut problem can be readily mapped to, and efficiently executed by, the quantum processor hardware.

In some implementations, a quantum processor includes many interconnected qubit devices, where the physical connections between the qubit devices in the quantum processor are designed based on the graph structure of the maximum cut problem. The connections can be specified according to a particular graph structure or a class of graph structures to be solved. In some implementations, the physical connections provided in the quantum processor provide physical interactions that closely match or otherwise correspond to a cost function Hamiltonian of the maximum cut problem. For example, the cost function for the maximum cut problem can be expressed in the form of ZZ operations acting pairwise on the states of connected vertices in a graph, and the quantum processor hardware can be configured to provide ZZ interactions acting pairwise on the quantum states of connected qubit devices. In such cases, the connections in the quantum processor can be used to directly apply the cost function Hamiltonian to the qubits defined by the connected pairs of qubit devices.

Accordingly, the techniques described here can provide technical advantages and improvements over existing technologies. The system can operate more efficiently for certain problems, for instance, by reducing computational overhead and by providing faster quantum logic operations. As an example, the computational overhead required to map a specific problem to a physical system hardware can be reduced or eliminated when the physical system hardware matches the structure of the problem. As another example, quantum logic transformations that are typically required to express a cost function Hamiltonian in terms of quantum logic operations provided by a quantum processor architecture can be reduced or eliminated when the cost function Hamiltonian matches the natural Hamiltonian provided by the quantum processor. As another example, swap gates and other operations required to shuttle information within the quantum processor can be reduced or eliminated when the qubit interactions specified by a quantum logic circuit match the qubit connections provided by the quantum processor. Other technical improvements and advantages may be achieved in some cases.

FIG. 1 is a schematic diagram of an example quantum computing system 100. The example quantum computing system 100 shown in FIG. 1 includes a control system 110, a signal delivery system 106, and a quantum information processor 102. A quantum computing system may include additional or different features, and the components of a quantum computing system may operate as described with respect to FIG. 1 or in another manner.

In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. Control devices (e.g., coupler devices) can be used to perform quantum logic operations on single qubits or conditional quantum logic operations on multiple qubits. In some instances, the conditional quantum logic can be performed in a manner that allows large-scale entanglement within the quantum computing device. Control signals can manipulate the quantum states of individual qubits and the joint states of multiple qubits. In some instances, information can be read out from the composite quantum system by measuring the quantum states of the individual qubits.

The example quantum computing system 100 shown in FIG. 1 can perform quantum computational tasks by executing quantum algorithms such as, for example, quantum approximate optimization. In some implementations, the quantum computing system 100 can operate using gate-based models for quantum computing. For example, quantum algorithms may be executed by applying quantum logic gates to qubits defined in the quantum computing system 100. In some implementations, the quantum computing system 100 is constructed and operated according to a scalable quantum computing architecture. For example, in some cases, the architecture can be scaled to a large number of qubits to achieve large-scale coherent quantum computing.

The example quantum information processor 102 shown in FIG. 1 includes qubit devices that are used to store and process quantum information. The quantum information processor 102 shown in FIG. 1 can be implemented, for example, as the quantum information processor 200 shown in FIG. 2, the quantum processors 600A, 600B shown in FIG. 6, or in another manner. In some cases, the quantum information processor 102 includes a superconducting circuit, and the qubit devices are implemented as circuit devices that include one or more Josephson junctions (e.g., in the form of superconducting quantum interference device (SQUID) loops or otherwise).

In the example quantum information processor 102, the qubit devices each store a single qubit (a bit of quantum information), and the data qubits can collectively define a computational state for a quantum computation. The quantum information processor 102 may also include readout devices that interact with the qubit devices to detect their quantum states. For example, the readout devices may generate readout signals that indicate the computational state. The quantum information processor 102 may also include coupler devices that selectively operate on individual qubits or pairs of qubits. For example, the coupler devices may be operated to produce entanglement over two or more qubits in the quantum information processor 102.

In some implementations, the example quantum information processor 102 can process the quantum information stored in the qubit devices by applying control signals to the qubit devices or to other control devices in the quantum information processor 102. In some examples, the operations can be expressed as single-qubit gates, two-qubit gates, or other types of logical gates that operate on one or more qubits. A sequence of quantum logic operations can be applied to the qubits to perform a quantum computation. The quantum computation may correspond to the quantum approximate optimization algorithm or another type of quantum algorithm.

In the example quantum computing system 100 shown in FIG. 1, the control system 110 controls operation of the quantum information processor 102. The example control system 110 may include data processors, signal generators, interface components and other types of systems or subsystems. In some cases, the control system 110 includes one or more classical computers or classical computing components.

In some implementations, the control system 110 generates a quantum logic control sequence based on a quantum computation to be performed. The quantum logic control sequence can include a sequence of quantum logic operations that can be executed by the quantum information processor 102. In some cases, the control system 110 generates a quantum logic control sequence for the quantum approximate optimization algorithm. The quantum logic control sequence may be converted to control signals (e.g., microwave control signals, optical control signals, DC bias control signals, etc.) that are delivered to the quantum information processor 102, and upon delivery, cause the quantum information processor 102 to execute the quantum computation.

In the example shown in FIG. 1, the signal delivery system 106 provides communication between the control system 110 and the quantum information processor 102. For example, the signal delivery system 106 can receive control signals (e.g., qubit control signals, readout control signals, coupler control signals, etc.) from the control system 110 and deliver the control signals to the quantum information processor 102. In some instances, the signal delivery system 106 performs preprocessing, signal conditioning, or other operations to the control signals before delivering them to the quantum information processor 102.

The signal delivery system 106 may include signal lines, signal processing hardware, filters, feedthrough devices, or a combination of these and other types of components. In some implementations, the signal delivery system 106 provides connections between different temperature and noise regimes. For example, the quantum computing system 100 may include a series of temperature stages between a higher temperature regime of the control system 110 and a lower temperature regime of the quantum information processor 102.

The quantum information processor 102, and in some cases all or part of the signal delivery system 106, can be maintained in a controlled environment. The environment can be provided, for example, by shielding equipment, cryogenic equipment, and other types of environmental control systems. In some examples, the components in the quantum information processor 102 operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In some implementations, a computer device 120 can access the quantum computing system 100, for instance, over a communication channel 122. The computer device 120 can be an access node that operates local to, or remote from, the control system 110 or other components of the quantum computing system 100. In some cases, the computer device 120 can be integrated with the control system 110 or other components of the quantum computing system 110. In some cases, the computer device 120 has a local data connection to the control system 110 and communicates directly with the control system 110 through the local data connection. For instance, the communication channel 122 can be a local data connection that is provided by a wireless Local Area Network, an Ethernet connection, a USB connection, or another type of wired or wireless connection. In some cases, the computer device 120 has a remote data connection to the control system 110 and communicates with the control system 110 through the remote data connection. For instance, the communication channel 122 can be a wide area network, such as, for example, the Internet or another type of wide area communication network. In some cases, communication channel 122 is another type of remote data connection (e.g., satellite-based connections, a cellular network, a private network, etc.).

In some instances, the control system 110 may initiate and control a quantum approximate optimization algorithm (QAOA) executed by the quantum computing system 100. In other instances, the computer device 120 initiates the execution (e.g., by providing instructions or inputs for the QAOA), and the control system 110 controls the execution of the QAOA according to instructions or inputs provided by the computer device 120. In response to the computer device 120, the quantum computing system 100 can provide an output of the execution to the computer device 120. The computer device 120 may initiate an execution of the quantum approximate optimization algorithm and receive the output of the execution by communicating with the quantum computing system 100 over the communication channel 122 or otherwise.

The quantum approximate optimization algorithm (QAOA) is an example of a hybrid quantum-classical algorithm. For example, the QAOA may be executed in a quantum computing system or a hybrid quantum-classical computing system that includes a quantum processor and one or more classical processors. For instance, the QAOA may be executed in the quantum computing system 100 shown in FIG. 1. As an example, the control system 110 may include, or may access, a classical co-processor that performs certain operations of the QAOA.

Figure 3:
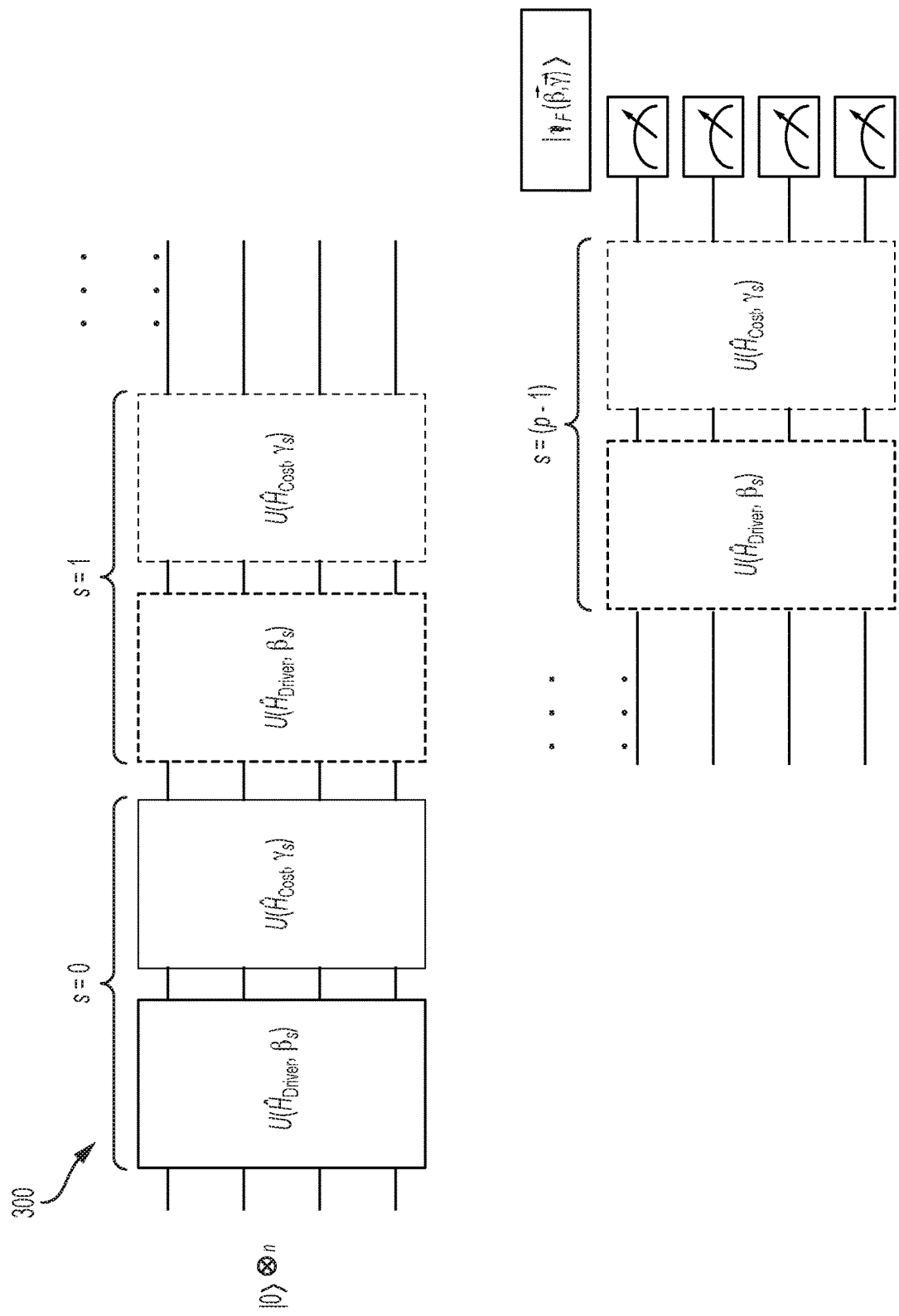
FIG. 3 is a diagram of an example quantum logic circuit.

In some implementations, constraint satisfaction problems can be encoded in a QAOA, and optimizing certain parameters (usually described as "angles," for example, the set of angles ($\vec{\beta}$, $\vec{\gamma}$) in the quantum logic circuit 300 shown in FIG. 3) in the QAOA leads to distributions that allow efficient sampling of (approximately) optimal solutions to the encoded constraint satisfaction problem. For example, the number of samples needed to find a feasible solution can be substantially smaller than the full exponential state space. Accordingly, the QAOA can be configured to maximize a cost function associated with a constraint satisfaction problem. More precisely, the QAOA can be configured to maximize the cost function $$C(z) = \sum_{a=1}^{m} C_a(z),$$

$$z \in \{0, 1\}^n,$$

$$C_a(z) = \begin{cases} 1, & \text{if } z \text{ satisfies the constraint } a \\ 0, & \text{if } z \text{ does not satisfy the constraint } a \end{cases}$$

And a particular constraint satisfaction problem can be encoded in the cost function C(z) by specifying the constraints a. An example constraint satisfaction problem is the maximum cut problem, which is discussed below, for example, with respect to FIG. 4.

A quantum approximate optimization algorithm (QAOA) can be executed in an iterative manner by a quantum processor (e.g., the quantum information processor 102) and a classical co-processor (e.g., in the control system 110). The classical co-processor can select a set of angles ($\vec{\beta}$, $\vec{\gamma}$), and the quantum processor can produce a quantum output state $|\psi_F(\vec{\beta}, \vec{\gamma})\rangle$ to maximize the expectation value $$\langle \psi_F(\vec{\beta}, \vec{\gamma}) | C | \psi_F(\vec{\beta}, \vec{\gamma}) \rangle$$

for the cost function C.

In some cases, multiple iterations of the QAOA are executed, and each iteration includes applying a driver Hamiltonian to a set of qubit devices in the quantum processor, and then applying a cost function Hamiltonian to the set of qubit devices in the quantum processor. For example, the quantum processor may produce the quantum output state $|\psi_F(\vec{\beta}, \vec{\gamma})\rangle$ by iteratively evolving a quantum system under the Hamiltonian $$\hat{H}_s = (1-s)\hat{H}_{Driver} + s\hat{H}_{Cost}$$

for each iteration s. Evolution of the quantum system under the Hamiltonian $\hat{H}_s$ for an iteration s can be described by the unitary operator for the iteration s in terms of the angles ($\beta_s$, $\gamma_s$) for the iteration as follows:

$$U_s = e^{-i\hat{H}_s dt} = U(\hat{H}_{Driver}, \beta_s) U(\hat{H}_{Cost}, \gamma_s).$$

In this notation, the objective of the QAOA can be described as maximizing $\langle \psi_F | C | \psi_F \rangle$ with respect to $|\psi_F\rangle$, where $$|\psi_F\rangle = \prod_{s=1}^{t} [U(\hat{H}_{Driver}, \beta_s) U(\hat{H}_{Cost}, \gamma_s)] |\psi_0\rangle$$

and where $|\psi_0\rangle$ represents an initial state of the quantum processor and $|\psi_F\rangle$ represents an output state of the quantum processor after t iterations. A quantum logic circuit can be executed to perform the above operations, for instance, according to the example shown in FIG. 3 or in another manner.

Figure 2:
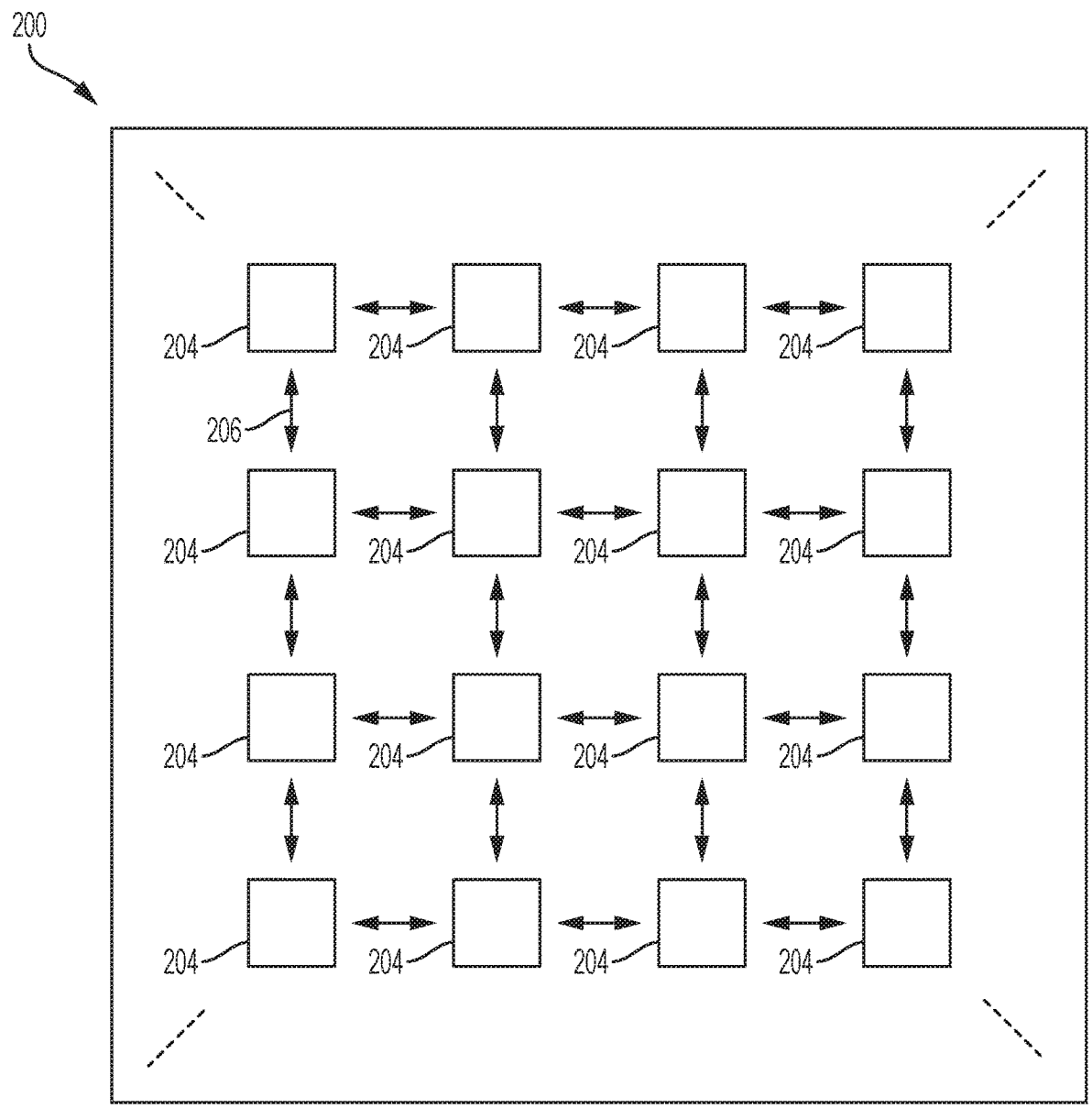
FIG. 2 is a block diagram on an example quantum information processor.

FIG. 2 is a block diagram showing an example quantum information processor 200. The example quantum information processor 200 includes a two-dimensional device array, which includes qubit devices 204 arranged in a lattice structure. Sixteen qubit devices are shown in FIG. 2. The example quantum information processor 200 may include additional devices; for example, the lattice structure may include additional rows or columns of qubit devices, coupler devices arranged between neighboring pairs of the qubit devices, readout devices arranged in proximity to the qubit devices, or a combination of these.

In the example shown in FIG. 2, the qubit devices 204 are arranged in a rectilinear (e.g., rectangular or square) array that extends in two spatial dimensions (in the plane of the page), and each qubit device 204 has four nearest-neighbor qubit devices. In some implementations, the qubit devices 204 can be arranged in another type of ordered array (e.g., triangular, hexagonal, etc.). In some instances, the rectilinear array also extends in a third spatial dimension (in/out of the page), for example, to form a cubic array or another type of three-dimensional array. The quantum information processor 200 may include additional devices, including additional qubit devices, coupler devices and other types of devices.

The example quantum information processor 200 is configured to apply entangling quantum logic operations 206 to neighboring pairs of the qubit devices 204. In some cases, the entangling quantum logic operations 206 are quantum logic gates that can be applied to two target qubits to produce an entangled state on the target qubits. Examples include the controlled-not (CNOT) gate, the controlled-phase (C-Phase) gate, and others.

In some cases, the entangling quantum logic operations 206 are executed by activating ZZ couplings between neighboring pairs of the qubit devices 204. For instance, in some superconducting quantum circuits, each neighboring pair of superconducting qubit devices i and j have a natural Hamiltonian that includes a ZZ coupling term (a term proportional to $\sigma_i^z \otimes \sigma_j^z$, where $\sigma_i^z$ represents the z Pauli operator applied to qubit i, and $\sigma_j^z$ represents the z Pauli operator applied to qubit j), and the ZZ coupling term produces an interaction between the qubits when the qubits evolve under the natural system Hamiltonian. In some contexts, the ZZ coupling term may be expressed in terms of the number operators (e.g., $\hat{a}^\dagger \hat{a}$ for each qubit) or other quantum operators that are proportional to the z Pauli operator $$\sigma^z = \begin{pmatrix} 1 & 0 \\ 0 & -1 \end{pmatrix}$$

for each qubit. The ZZ coupling term may be expressed with a scaling factor (e.g., the coupling strength $\chi$) that characterizes the rate of the coupling between the qubits defined by the two qubit devices.

In some cases, quantum information processor 200 can be implemented as a superconducting circuit, qubit devices 204 may be implemented as circuit devices that include one or more Josephson junctions (e.g., superconducting quantum interference device (SQUID) loops or other circuit structures). Pairs of the qubit devices can be coupled to each other through a capacitor, an inductor, or another mode of coupling. In some examples, a transition frequency of a qubit device is tunable, for example, by application of an offset field. For instance, a tunable qubit device (e.g., a tunable transmon qubit device, a fluxonium qubit device, etc.) may include a superconducting loop (e.g., a SQUID loop) that is tunable by application of magnetic flux. In some examples, the transition frequency of a qubit device is not tunable by application of an offset field and is independent of magnetic flux experienced by the qubit device. For instance, a fixed-frequency qubit device may have a fixed transition frequency that is defined by an electronic circuit of the qubit device. As an example, a superconducting qubit device (e.g., a fixed-frequency transmon qubit) may be implemented without a SQUID loop. In some examples, a fixed-frequency qubit device is coupled to one or more tunable-frequency qubit devices.

In the example shown in FIG. 2, the qubit devices 204 can each be encoded with a single bit of quantum information. Each of the qubit devices has two eigenstates used as computational basis states ("0" and "1"), and each qubit device can transition between its computational basis states or exist in an arbitrary superposition of its basis states. In some implementations, connections between the qubit devices 204 in the quantum information processor 200 allow the qubits to be selectively coupled on-demand, for instance, to apply a driver Hamiltonian, to apply a cost function Hamiltonian, or to perform other types of operations.

In some instances, information is encoded in the qubit devices 204, and the information can be processed by applying a quantum logic control sequence. For instance, input information can be encoded in the computational states or computational subspaces defined by data qubits encoded in some of all of the qubit devices. The information can be processed, for example, by applying the quantum logic control sequence to the input information. The quantum logic control sequence may be represented as quantum logic gates or other quantum logic operations. For instance, a quantum computation may be executed by a combination of single-qubit gates and two-qubit gates. In some cases, information is processed in another manner. Processing the information encoded in the qubit devices 204 produces output information that can be extracted from the qubit devices. The output information can be extracted, for example, by performing state tomography or individual readout operations.

In some instances, the quantum information processor 200 executes a quantum approximate optimization algorithm. In some cases, a quantum approximate optimization algorithm can be used as a benchmark or metric for assessing the performance of the quantum information processor 200. For instance, the quantum approximate optimization algorithm can be implemented on quantum information processors of varying sizes—from very small (e.g., 2-qubit systems) to very large (e.g., hundreds or thousands of qubits). In some cases, the output of the quantum approximate optimization algorithm can be compared against a standard or benchmark value as a standardized assessment of the quantum information processor 200. For instance, the algorithm may be used to evaluate hardware performance or other attributes of the quantum information processor 200.

FIG. 3 is a diagram of an example quantum logic circuit 300. The example quantum logic circuit 300 shown in FIG. 3 represents p iterations of a quantum approximate optimization algorithm (QAOA). The quantum logic circuit 300 can be executed by a computing system, for example, by the example quantum computing system 100 shown in FIG. 1. In some cases, a general purpose quantum processor executes the quantum logic circuit 300. In some cases, a special purpose quantum processor executes the quantum logic circuit 300.

In the example shown in FIG. 3, the quantum logic circuit 300 is applied to n qubits; the quantum logic circuit 300 can be adapted for application on any number of qubits (e.g., two qubits, ten qubits, hundreds or thousands of qubits). As shown in FIG. 3, the qubits are initialized to the computational basis state $|0\rangle^{\otimes n}$, where each individual qubit is in the $|0\rangle$ state. Each iteration (s) of the QAOA includes unitary evolution under the unitary driver operator for iteration (s)

$$U(\hat{H}_{Driver}, \beta_s)$$

that is parameterized by an angle $\beta_s$ and a driver Hamiltonian $\hat{H}_{Driver}$; followed by unitary evolution under the unitary cost operator for iteration (s)

$$U(\hat{H}_{Cost}, \gamma_s)$$

that is parameterized by an angle $\gamma_s$ and a cost function Hamiltonian $\hat{H}_{Cost}$. The values of the angles ($\beta_s$, $\gamma_s$) that parameterize the unitary driver operator and the unitary cost operator, respectively, are updated for each iteration.

As shown in FIG. 3, p iterations of the QAOA evolves the n qubits defined in the quantum processor to the output state $|\psi_F(\vec{\beta}, \vec{\gamma})\rangle$. The output state can be measured, for example, by performing projective measurements on the n qubits or by another type of measurement. Measuring the qubit devices provides an output from an execution of the QAOA (e.g., an execution of one or more iterations of the QAOA). The quantum logic circuit 300 can be iterated to sample the distribution of computational basis states in the output state $|\psi_F(\vec{\beta}, \vec{\gamma})\rangle$. For example, each iteration can produce a bitstring representing one of the computational basis states of the n qubits.

In some implementations, a co-processor (e.g., a classical co-processor) selects values for the set of angles ($\vec{\beta}, \vec{\gamma}$), and a quantum processor then executes the quantum logic circuit 300 to prepare the output state $|\psi_F(\vec{\beta}, \vec{\gamma})\rangle$ based on the selected values for the set of angles and the cost operator (the cost operator represents the problem for which an optimal solution is sought). The output state is then measured to obtain a set of bitstrings (e.g., a projective measurement can be used to obtain classical bitstrings).

The quantum logic circuit 300 shown in FIG. 3 can be configured to find solutions to the maximum cut problem by defining a cost function Hamiltonian $\hat{H}_{Cost}$ associated with the maximum cut problem. For instance, the maximum cut problem can be encoded in the QAOA by defining the cost function Hamiltonian $$\hat{H}_{Cost} = \frac{1}{2}(I_{ij} - \sigma_i^z \otimes \sigma_j^z)$$

for pairs of qubits, as discussed below with respect to FIG. 4. In some cases, multiple iterations of the QAOA are executed, and each iteration includes applying a driver Hamiltonian, and then applying a cost function Hamiltonian that activates ZZ couplings between respective pairs of qubit devices in the quantum processor. The ZZ couplings between a pair of qubits may be activated by allowing the pair of qubit devices to evolve under a natural Hamiltonian for a time period τ (e.g., as shown in FIG. 5). In some examples, the driver Hamiltonian $\hat{H}_{Driver}$ and cost function Hamiltonian $\hat{H}_{Cost}$ can be expressed $$\hat{H}_{Driver} = \hat{H}_z = \frac{1}{2}(I_i \otimes \sigma_j^x + \sigma_i^x \otimes I_j)$$

$$\hat{H}_{Cost} = \hat{H}_z = \frac{1}{2}(I_{ij} - \sigma_i^z \otimes \sigma_j^z)$$

for pairs of qubits, where $\sigma_i^z$ represents the z Pauli operator applied to qubit i, and $\sigma_j^z$ represents the z Pauli operator applied to qubit j, and where $\sigma_i^x$ represents the x Pauli operator applied to qubit i, and $\sigma_j^x$ represents the x Pauli operator applied to qubit j. Evolution of the quantum system under the Hamiltonian $\hat{H}_s$ for an iteration s can be described by the unitary operator for the iteration s $$U_s = e^{-i\hat{H}_s dt} = e^{-i(1-s)\hat{H}_X dt} e^{-is\hat{H}_Z dt}$$

The unitary operator $U_s$ for an iteration s can be expressed in terms of the angles $(\beta_s, \gamma_s)$ for the iteration as follows:

$$U_s = U(\hat{H}_{Driver}, \beta_s) U(\hat{H}_{Cost}, \gamma_s)$$

where $$U(\hat{H}_{Driver}, \beta_s) = e^{-i\beta_s \hat{H}_X}$$

$$U(\hat{H}_{Cost}, \gamma_s) = e^{-i\gamma_s \hat{H}_Z}$$

and $$\beta_s = (1-s)dt$$

$$\gamma_s = (s)dt.$$

By applying the unitary operators above, the QAOA algorithm can measure the value $$\langle \psi_F(\vec{\beta}, \vec{\gamma}) | \sigma_i^z \otimes \sigma_j^z | \psi_F(\vec{\beta}, \vec{\gamma}) \rangle$$

for each pair of qubits and sum the values over all pairs of connected qubits to evaluate the overall cost function.

Figure 4:
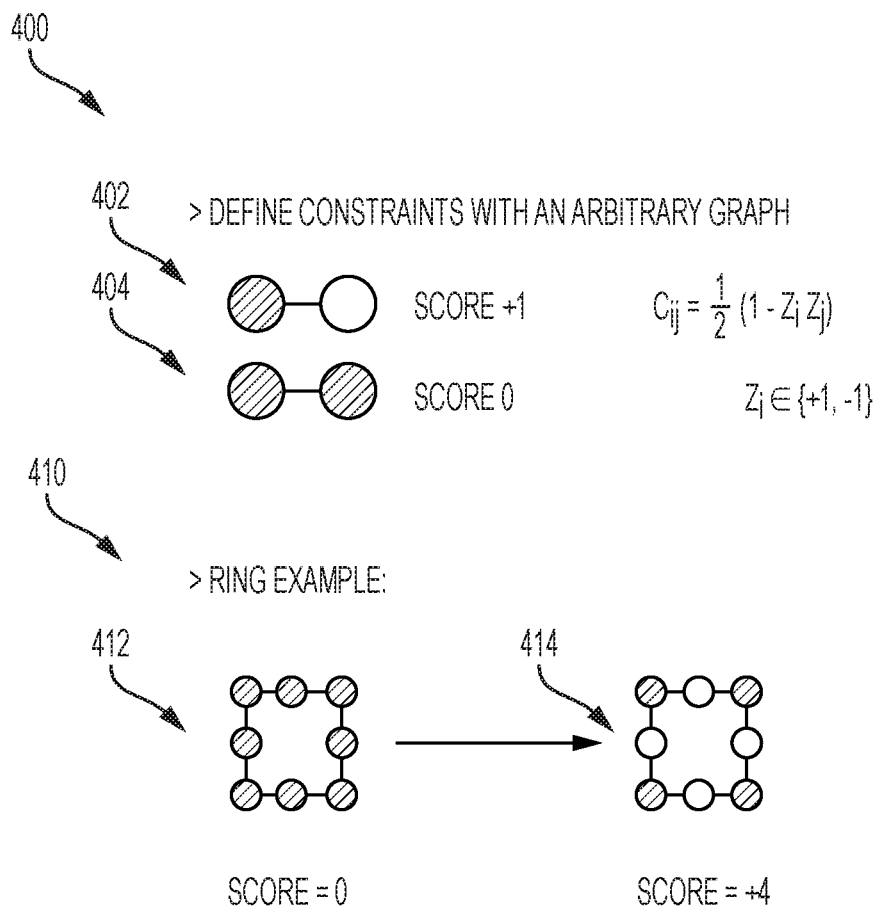
FIG. 4 is a diagram of example graphs associated with a maximum cut problem.
Figure 5:
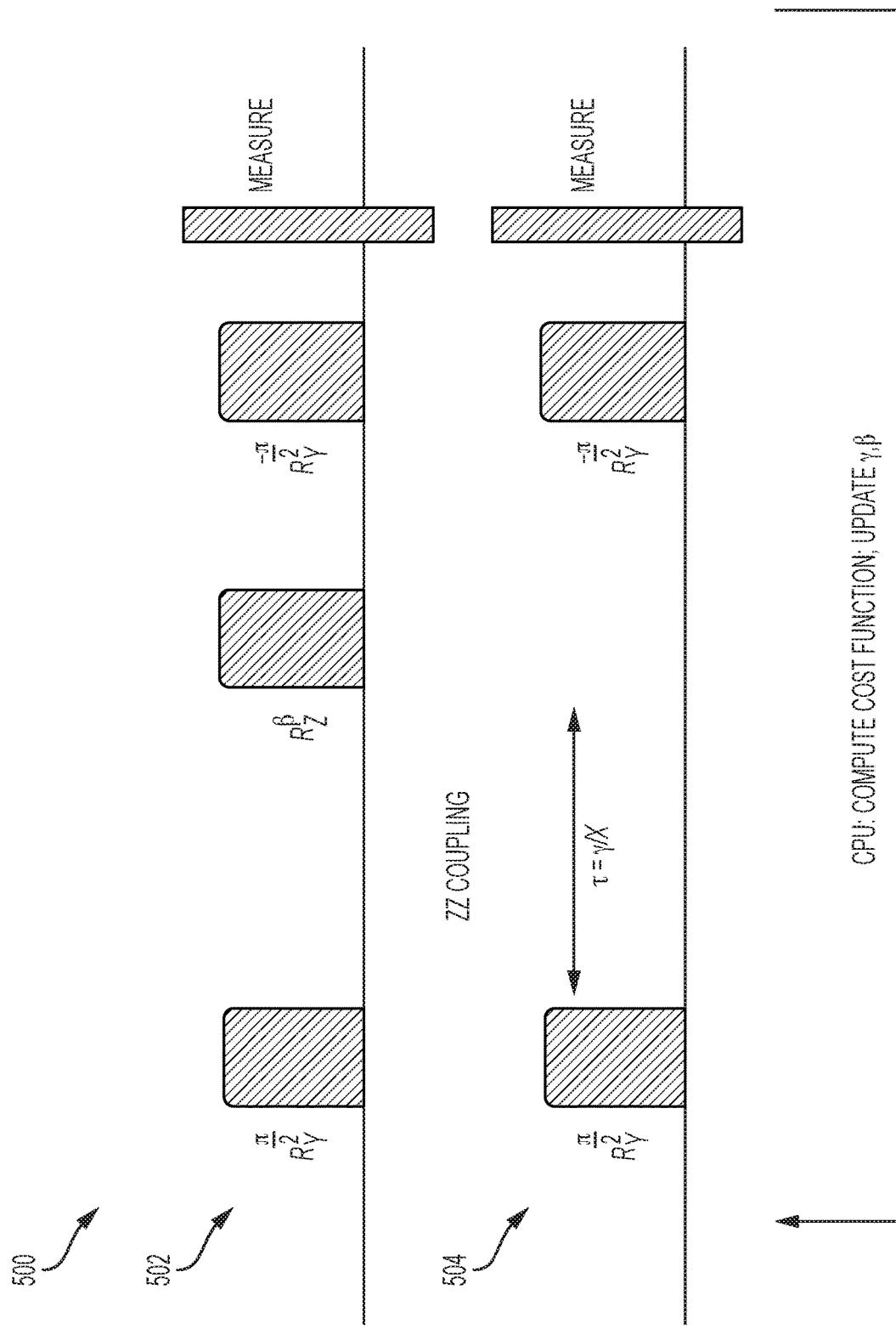
FIG. 5 is a diagram of an example pulse sequence.

FIG. 4 is a diagram of example graphs associated with a maximum cut problem. As shown in FIG. 4, the maximum cut problem is defined over a graph that includes vertices connected by edges. The maximum cut problem can be described as a binary shading problem over a graph, where the solution to the maximum cut problem is the set of vertex shading assignments that maximize the score of all edges in the graph (where each vertex is shaded either black or white). As shown at 400, constraints can be defined with an arbitrary graph. As shown at 402, when the vertices connected by an edge are shaded different from each other, the edge connecting the vertices is assigned a score of +1; and when the vertices connected by an edge are shaded alike, the edge connecting the vertices is assigned a score of 0.

As shown in FIG. 4, the cost function for an edge connecting vertices i and j in the graph can be expressed $C_{ij} = (\frac{1}{2})(1 - Z_i Z_j)$. And the cost function over the full graph can be expressed $$C = \frac{1}{2} \sum_{i,j} 1 - Z_i Z_j$$

If the shading of the vertices i and j are encoded in the computational states of two qubits, the cost function for the maximum cut problem can be expressed in the form of the cost function Hamiltonian $$\hat{H}_{Cost} = \frac{1}{2}(I_{ij} - \sigma_i^z \otimes \sigma_j^z)$$

for pairs of qubits, where $\sigma_i^z$ represents the z Pauli operator applied to qubit i, and $\sigma_j^z$ represents the z Pauli operator applied to qubit j. The QAOA with this cost function Hamiltonian can be executed using the example pulse sequence 500 shown in FIG. 5, or in another manner.

At 410 in FIG. 4, the maximum cut problem is shown for an example graph having a ring structure. In the example shown, the graph includes eight vertices connected in a ring structure. As shown at 412, shading all vertices alike (e.g., black) produces a score of zero under the cost function $C_{ij} = (\frac{1}{2})(1 - Z_i Z_j)$. As shown at 414, shading the vertices in an alternating sequence (e.g., black, white, black, white, etc.) produces a score of four under the cost function $$C = \frac{1}{2} \sum_{i,j} 1 - Z_i Z_j$$

FIG. 5 is a diagram of an example pulse sequence 500. The example pulse sequence 500 shown in FIG. 5 can be used to implement an iteration of the QAOA having a cost function associated with the maximum cut problem. The operations 502 shown in the top row of FIG. 5 are applied to one qubit device; the operations 504 shown in the bottom row of FIG. 5 are applied to another qubit device. The pulse sequence 500 shown in FIG. 5 for two qubit devices can be adapted for maximum cut problems defined over any number of qubits. In some implementations, a control system is configured to execute the pulse sequence 500; for example, the control system may store a quantum program that, when executed by the control system, causes the control system to initiate the operations shown in FIG. 5.

As shown in FIG. 5, a first pair of pulses $R_Y^{\pi/2}$ apply a π/2 rotation about the Y-axis to each respective qubit device. After the first pair of pulses $R_Y^{\pi/2}$, a ZZ coupling is activated between the two qubit devices. In the example shown in FIG. 5, the ZZ coupling is activated by allowing the qubit devices to evolve under their natural coupling Hamiltonian for time period τ=γ/χ. Here, the angle γ is a parameter provided for the QAOA algorithm, and χ is the coupling strength of the ZZ coupling between the qubit devices.

In the example shown in FIG. 5, the ZZ coupling is activated for the time period τ with the coupling strength χ, to evolve the pair of qubits devices under the unitary operator $$U(\tau) = e^{i\hbar\chi\tau} \begin{pmatrix} 1 & 0 & 0 & 0 \\ 0 & e^{-2i\hbar\chi\tau} & 0 & 0 \\ 0 & 0 & e^{-2i\hbar\chi\tau} & 0 \\ 0 & 0 & 0 & 1 \end{pmatrix}$$

which is equivalent (up to the convention of χ and τ) to the unitary operator $$U(\tau) = \begin{pmatrix} 1 & 0 & 0 & 0 \\ 0 & e^{i\pi\chi\tau} & 0 & 0 \\ 0 & 0 & e^{-2i\hbar\chi\tau} & 0 \\ 0 & 0 & 0 & 1 \end{pmatrix}.$$

In some implementations, the unitary operator $U(\tau)$ represents an ideal version of the unitary that the control system applies during the time period $\tau$ under pure ZZ coupling. There may be other terms, other than pure ZZ coupling, in the system Hamiltonian during the time period $\tau$. For example, there may be other terms due to noise or by design that cause the qubit devices to evolve under ZZ coupling and some other physical process. In some instances, effects of the other physical process can be reduced, canceled or eliminated, for example, by filtering, error correcting, refocusing, or other types of operations.

As shown in FIG. 5, after the ZZ coupling has been applied for the appropriate time, a pulse $R_Z^\beta$ applies a rotation by the angle $\beta$ about the Y-axis to the first qubit device. Here, the angle $\beta$ is a parameter provided for the QAOA algorithm. After the pulse $R_Z^\beta$, a second pair of pulses $R_Y^{\pi/2}$ apply a $-\pi/2$ rotation about the Y-axis to each respective qubit device. After the second pair of pulses $R_Y^{\pi/2}$, the qubit devices are each measured. For example, a projective measurement may obtain a pair of bits from the qubit devices. Measuring the pair of qubit devices provides an output from an execution of the QAOA (e.g., execution of an iteration of the QAOA). As shown in FIG. 5, the pulse sequence 500 may be iterated. For instance, a classical co-processor may calculate a cost function based on the measured pair of bits, update values of the angles $\beta$ and $\gamma$; and the pulse sequence 500 can be repeated for the updated values of the angles $\beta$ and $\gamma$ to obtain another pair of bits.

The example pulse sequence 500 can be applied to pairs of connected qubit devices in a quantum processor to execute a quantum approximate optimization algorithm (QAOA) having a cost function that encodes the maximum cut problem. In some cases, the qubits defined in the quantum processor correspond to vertices of the graph represented by the maximum cut problem, and one or more of the connections correspond to edges of the graph represented by the maximum cut problem. For example, the graph structure of the maximum cut problem may be mapped directly to the connectivity of the qubit devices in the quantum processor, or the graph structure of the maximum cut problem may be mapped approximately to the connectivity of the qubit devices in the quantum processor. Examples are discussed with respect to FIG. 6.

Figure 6:
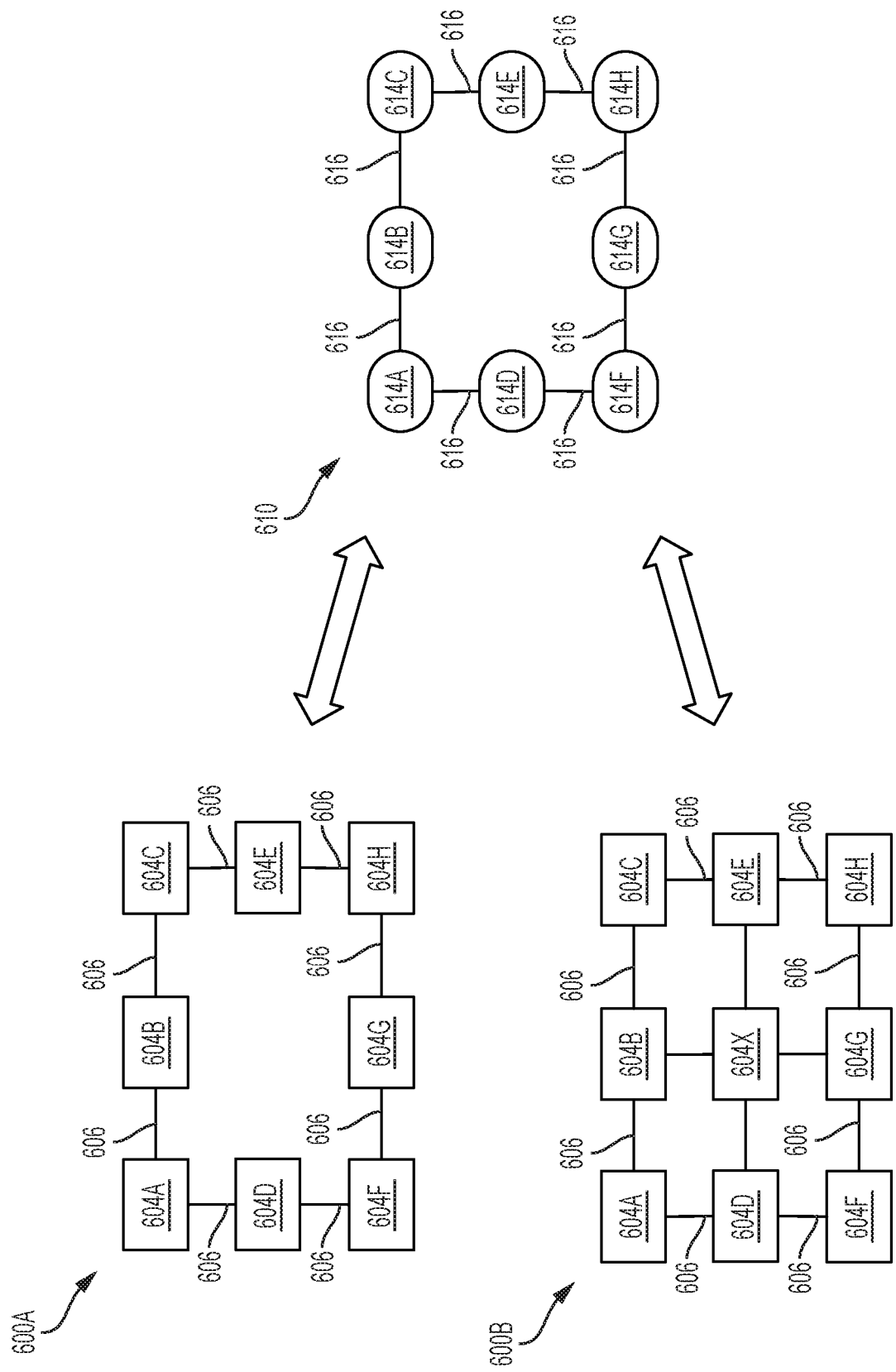
FIG. 6 is a block diagram of two example quantum information processors associated with an example graph structure.

FIG. 6 is a block diagram 600 of two example quantum information processors 600A, 600B associated with an example graph structure 610. The example graph structure 610 is equivalent to the ring structure shown at 410 in FIG. 4. The graph structure 610 includes eight vertices 614A, 614B, 614C, 614D, 614E, 614F, 614G, 614H, and eight edges 616 that connect the vertices in a ring shape.

A first example processor 600A shown in FIG. 6 includes eight qubit devices 604A, 604B, 604C, 604D, 604E, 604F, 604G, 604H, and eight connections 606 that connect the qubit devices in a ring shape. The eight vertices in the graph structure 610 can be mapped to the eight qubit devices in the quantum processor 600A, and the eight edges in the graph structure 610 can be mapped to the eight connections 606 in the quantum processor. In this manner, graph states can be encoded in the qubits, and the cost function associated with the maximum cut problem can be evaluated on connected pairs of the qubit devices. For instance, the cost function can be evaluated on the pair of connected qubit devices 604A, 604B, the pair of connected qubit devices 604B, 604C, the pair of connected qubit devices 604C, 604D, etc.

A second example processor 600B shown in FIG. 6 includes nine qubit devices 604A, 604B, 604C, 604D, 604E, 604F, 604G, 604H, 604X and twelve connections 606 that connect the qubit devices in a square array. The eight vertices in the graph structure 610 can be mapped to any eight of the qubit devices in the quantum processor 600B, and the eight edges in the graph structure 610 can be mapped to the eight connections between qubit devices that represent vertices of the graph structure 610. In this manner, graph states can be encoded in the qubits, and the cost function associated with the maximum cut problem can be evaluated on connected pairs of the qubit devices. For instance, the cost function can be evaluated on the pair of connected qubit devices 604A, 604B, the pair of connected qubit devices 604B, 604X, the pair of connected qubit devices 604X, 604E, etc.

Figure 7:
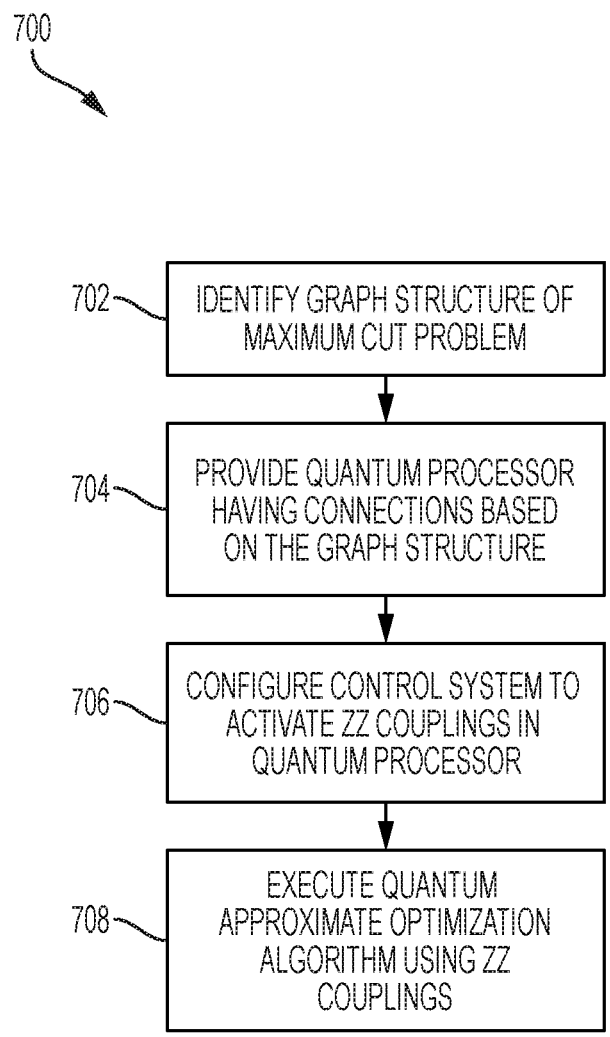
FIG. 7 is a flow chart of an example process for quantum approximate optimization.

FIG. 7 is a flow chart of an example process 700 for quantum approximate optimization. The example process 700 can include additional or different operations, and the operation can be performed in the order shown or in another order. In some cases, individual operations in the process 700 can be implemented as sub-processes that include multiple operations, or multiple operations in the process 700 can be combined. In some cases, one or more operations in the process 700 can be iterated or repeated.

At 702, a graph structure associated with a maximum cut problem is identified. The graph structure includes vertices connected by edges. Graph structures associated with two example maximum cut problems are shown in FIG. 4; these or other types of graph structures may be identified at 702. In some cases, the graph structure identified at 702 is, or is a member of, a general class of graph structures. For example, the graph structure can be a cyclic graph structure; a directed acyclic graph structure; a tree structure; a binary tree structure; a planar graph structure (a graph that can be drawn on a plane without edges crossing); or another type of graph structure.

At 704, a quantum processor designed to have connections based on the graph structure is provided. The connections in the quantum processor connect respective pairs of qubit devices in the quantum processor, and each connection is configured to provide a coupling between the pair of qubit devices that it connects. In some examples, the quantum processor is or includes a superconducting quantum circuit, the qubit devices in the quantum processor are superconducting qubit devices (e.g., transmon qubit devices, fluxonium qubit devices, or others), and the connections between the pairs of qubit devices are capacitive connections. Or another type of quantum processor may be provided at 704. For example, the quantum processor may include other types of qubit devices (e.g., spin qubits, trapped ion qubits, etc.) having other types of connections (e.g., chemical bonds, optical connections, etc.). In some cases, the quantum processor provided at 704 is a special purpose quantum processor; for example, the quantum processor may have special purpose logic circuitry that is adapted to perform quantum logic operations of the QAOA. The special purpose logic circuitry may be designed based on the graph structure identified at 702, for example, to execute a cost function for the maximum cut problem (e.g., by directly applying the corresponding cost function Hamiltonian).

The quantum processor provided at 704 may have connections that exactly match the graph structure identified at 702. An example is shown in FIG. 6, where the qubit device connectivity in the quantum processor 600A directly matches the example graph structure 610. The quantum processor provided at 704 may have connections that are based on the graph structure of the maximum cut problem, but do not directly match the graph structure identified at 702. An example is shown in FIG. 6, where the qubit device connectivity in the quantum processor 600B does not directly match the example graph structure 610, but the example graph structure 610 can be mapped to subsets of the qubit devices and connections in the quantum processor 600B. In some cases, the connections may be configured such that a general class graph structures can be mapped to the qubit device connectivity structure of the quantum processor. As an example, the connections may be configured such that planar graphs in a certain size range (measured by the number of vertices, edges, or both) can be mapped to the qubit device connectivity structure of the quantum processor.

In some implementations, the quantum processor is provided at 704 by making the quantum processor accessible in a quantum computing system. For instance, a computing environment may expose the quantum processor to one or more remote or local computer device through an application programming interface (API) or another type of interface. Access to the quantum processor may be provided through a local network, through a wide area network (e.g., the Internet), or otherwise. For example, the quantum processor may be provided at 704 by providing the access to quantum computing system 100, by providing access to the quantum information processor 102, or otherwise. In some implementations, the quantum processor is provided at 704 by physically delivering the quantum processor in a larger computer system, or for use or deployment in a larger computer system. For example, the quantum processor may be provided at 704 by delivering the quantum computing system 100, by delivering the quantum information processor 102, or otherwise.

Before the quantum processor is provided at 704, it can be manufactured, assembled, fabricated, or otherwise produced according to the design. For example, the quantum processor design may specify the connection according to the graph structure identified at 702, and the quantum processor may then be fabricated to have the specified connections. In some cases, the quantum processor is designed to solve maximum cut problems using QAOA, and the qubit devices and connections between them are specified and manufactured to provide ZZ couplings corresponding to the cost function Hamiltonian for the maximum cut problem.

At 706, a control system is configured to activate ZZ couplings in the quantum processor. For example, the control system 110 shown in FIG. 1 may be configured to activate ZZ couplings between pairs of connected qubits in the example quantum information processors 600A, 600B shown in FIG. 6; and the connections 606 can mediate the ZZ couplings between the respective pairs of qubit devices. In some cases, the control system is configured to activate the ZZ couplings by allowing the pairs of connected qubits to evolve under their natural coupling Hamiltonian for a specified amount of time.

In some implementations, the control system is programmed to execute a QAOA using a set of qubit devices and connections between the qubit devices in the quantum processor. The control system may be configured to activate the ZZ couplings between all or less than all pairs of the qubit devices that are connected in the quantum processor, for instance, to execute a cost function associated with the maximum cut problem (e.g., as shown in the example pulse sequence 500 in FIG. 5 or otherwise). In some examples, vertices in the graph structure of the maximum cut problem are mapped to the qubit devices in the quantum processor, and edges in the graph structure of the maximum cut problem are mapped to connections between the respective pairs of the qubit devices in the quantum processor.

At 708, a quantum approximate optimization algorithm QAOA is executed using the ZZ couplings in the quantum processor. The QAOA can define a cost function associated with the maximum cut problem referred to at 702; and the quantum processor provided at 704 may be operated using the control system configured at 706, such that the control system systematically activates the ZZ couplings in the quantum processor. In some cases, the QAOA may be executed by applying the example quantum logic circuit 300 shown in FIG. 3 to the qubits in the quantum processor, or the QAOA may be executed in another manner. In some cases, an iteration of the QAOA may be executed using the example pulse sequence 500 shown in FIG. 5, or an iteration of the QAOA may be executed in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, processors of any kind of digital computer, both general and special purpose quantum processors, and processors of any kind of quantum computing system. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example quantum memory devices, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect, a computer system is configured to execute a quantum approximate optimization algorithm.

In a first example, a control system in a quantum computing system identifies a pair of qubit devices in a quantum processor. The quantum processor includes a connection that provides coupling between the pair of qubit devices. ZZ coupling between the pair of qubit devices is activated to execute a cost function defined in a quantum approximate optimization algorithm. The cost function is associated with a maximum cut problem, and the ZZ coupling is activated by allowing the pair of qubits to evolve under a natural Hamiltonian for a time period τ. One or more of the pair of qubit devices is measured to obtain an output from an execution of the quantum approximate optimization algorithm.

In a second example, a computer system includes a quantum processor and a control system. The control system is configured to communicate with the quantum processor and perform one or more of the operations of the first example.

In a third example, an execution of a quantum approximate optimization algorithm by a computing system comprising a quantum processor is initiated. The execution of the quantum approximate optimization algorithm by the computing system includes one or more of the operations of the first example. In response to the initiating, an output of the execution is received from the computing system.

Implementations of the first, second, or third example may include one or more of the following features. The pair of qubit devices can be a pair of superconducting qubit devices, and the connection between them can be a capacitive connection. The pair of qubit devices can include at least one transmon device. The ZZ coupling can be activated for the time period τ with a coupling strength χ, to evolve the pair of qubits devices under the unitary operator $$U(\tau) = e^{i\hbar\chi\tau}\begin{pmatrix} 1 & 0 & 0 & 0 \\ 0 & e^{-2i\hbar\chi\tau} & 0 & 0 \\ 0 & 0 & e^{-2i\hbar\chi\tau} & 0 \\ 0 & 0 & 0 & 1 \end{pmatrix}.$$

Activating the ZZ coupling between the pair of qubit devices can include applying a cost function Hamiltonian $$\hat{H}_{Cost} = \frac{1}{2}(I_{ij} - \sigma_i^z \otimes \sigma_j^z)$$

to the pair of qubit devices for a time period τ. Here, $\sigma_i^z \otimes \sigma_j^z$ represents a ZZ coupling term for the pair of qubit devices. Multiple iterations of the quantum approximate optimization algorithm can be executed. Each iteration can include: applying a driver Hamiltonian to a set of qubit devices in the quantum processor; and applying a cost function Hamiltonian to the set of qubit devices in the quantum processor. Applying the cost function Hamiltonian can include activating ZZ couplings between respective pairs of the qubit devices in the quantum processor. A graph structure of the maximum cut problem can include edges that are mapped to connections between the respective pairs of the qubit devices in the quantum processor. An execution of the quantum approximate optimization algorithm may be initiated by a remote device that operates remote from the computing system. The remote device may initiate the execution and receive the output by communicating with the computing system over a communication network. An execution of the quantum approximate optimization algorithm may be initiated by a local device associated with the control system.

In a fourth example, a graph structure associated with a maximum cut problem is identified. The graph structure includes vertices connected by edges. A quantum processor designed to have connections based on the graph structure is provided. The connections in the quantum processor connect respective pairs of qubit devices in the quantum processor, and each connection is configured to provide a coupling between the pair of qubit devices that it connects. A control system is configured to activate a ZZ coupling between each of the respective pairs of qubit devices to execute a cost function defined in a quantum approximate optimization algorithm. The cost function is associated with the maximum cut problem.

Implementations of the fourth example may include one or more of the following features. The quantum processor having the connections can be manufactured or otherwise produced before it is provided. The qubit devices can be superconducting qubit devices, and the connections can be capacitive connections. Each pair of qubit devices can include at least one transmon device. The connections in the quantum processor can define a qubit connectivity structure that matches the graph structure of the maximum cut problem. The connections in the quantum processor can define a qubit connectivity structure that does not match the graph structure of the maximum cut problem.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A quantum computing method comprising:
    by operation of a control system in a quantum computing system, identifying a pair of qubit devices in a quantum processor, wherein the quantum processor comprises a connection that provides coupling between the pair of qubit devices;
    activating a ZZ coupling between the pair of qubit devices to execute a cost function defined in a quantum approximate optimization algorithm, the cost function being associated with a maximum cut problem, wherein the ZZ coupling is activated by allowing the pair of qubit devices to evolve under a natural Hamiltonian for a time period $\tau$; and
    measuring one or more of the pair of qubit devices to obtain an output from an execution of the quantum approximate optimization algorithm.

2. The quantum computing method of claim 1, wherein the pair of qubit devices comprises a pair of superconducting qubit devices, and the connection comprises a capacitive connection.

3. The quantum computing method of claim 2, wherein the pair of qubit devices includes at least one transmon device.

4. The quantum computing method of claim 1, wherein the ZZ coupling is activated for the time period $\tau$ with a coupling strength $\chi$, to evolve the pair of qubit devices under the unitary operator $$U(\tau) = e^{i\hbar\chi\tau}\begin{pmatrix} 1 & 0 & 0 & 0 \\ 0 & e^{-2i\hbar\chi\tau} & 0 & 0 \\ 0 & 0 & e^{-2i\hbar\chi\tau} & 0 \\ 0 & 0 & 0 & 1 \end{pmatrix}.$$

5. The quantum computing method of claim 1, wherein activating the ZZ coupling between the pair of qubit devices comprises applying a cost function Hamiltonian $$\hat{H}_{Cost} = \tfrac{1}{2}(I_{ij} - \sigma_i^z \otimes \sigma_j^z)$$

to the pair of qubit devices for a time period $\tau$, wherein $\sigma_i^z \otimes \sigma_j^z$ represents a ZZ coupling term for the pair of qubit devices.

6. The quantum computing method of claim 1, comprising executing multiple iterations of the quantum approximate optimization algorithm, each iteration comprising:
    applying a driver Hamiltonian to a set of qubit devices in the quantum processor; and
    applying a cost function Hamiltonian to the set of qubit devices in the quantum processor, wherein applying the cost function Hamiltonian comprises activating ZZ couplings between respective pairs of the qubit devices in the quantum processor.

7. The quantum computing method of claim 6, wherein a graph structure of the maximum cut problem comprises edges that are mapped to connections between the respective pairs of the qubit devices in the quantum processor.

8. A computing system comprising:
    a quantum processor;
    a control system configured to communicate with the quantum processor and perform operations comprising:
        identifying a pair of qubit devices in the quantum processor, wherein the quantum processor comprises a connection that provides coupling between the pair of qubit devices;
        activating a ZZ coupling between the pair of qubit devices to execute a cost function defined in a quantum approximate optimization algorithm, the cost function being associated with a maximum cut problem, wherein the ZZ coupling is activated by allowing the pair of qubit devices to evolve under a natural Hamiltonian for a time period $\tau$; and
        measuring one or more of the pair of qubit devices to obtain an output from an execution of the quantum approximate optimization algorithm.

9. The computing system of claim 8, wherein the quantum processor comprises a superconducting quantum processor, the pair of qubit devices comprises a pair of superconducting qubit devices, and the connection comprises a capacitive connection.

10. The computing system of claim 9, wherein the pair of qubit devices includes at least one transmon device.

11. The computing system of claim 8, wherein the control system is configured to activate the ZZ coupling for the time period $\tau$ with a coupling strength $\chi$, to evolve the pair of qubit devices under the unitary operator $$U(\tau) = e^{i\hbar\chi\tau}\begin{pmatrix} 1 & 0 & 0 & 0 \\ 0 & e^{-2i\hbar\chi\tau} & 0 & 0 \\ 0 & 0 & e^{-2i\hbar\chi\tau} & 0 \\ 0 & 0 & 0 & 1 \end{pmatrix}.$$

12. The computing system of claim 8, wherein activating the ZZ coupling between the pair of qubit devices comprises applying a cost function Hamiltonian $$\hat{H}_{Cost} = \frac{1}{2}(I_{ij} - \sigma_i^z \otimes \sigma_j^z)$$

to the pair of qubit devices for a time period $\tau$, wherein $\sigma_i^z \otimes \sigma_j^z$ represents a ZZ coupling term for the pair of qubit devices.

13. The computing system of claim 8, wherein the control system is configured to execute multiple iterations of the quantum approximate optimization algorithm, each iteration comprising:
 applying a driver Hamiltonian to a set of qubit devices in the quantum processor; and
 applying a cost function Hamiltonian to the set of qubit devices in the quantum processor, wherein applying the cost function Hamiltonian comprises activating ZZ couplings between respective pairs of the qubit devices in the quantum processor.

14. The computing system of claim 13, wherein the control system is configured to map edges from a graph structure of the maximum cut problem to connections between the respective pairs of the qubit devices in the quantum processor.

15. A method comprising:
 initiating an execution of a quantum approximate optimization algorithm by a computing system comprising a quantum processor, wherein the execution of the quantum approximate optimization algorithm comprises:
  by operation of a control system in the computing system, identifying a pair of qubit devices in the quantum processor, wherein the quantum processor comprises a connection that provides coupling between the pair of qubit devices;
  activating a ZZ coupling between the pair of qubit devices to execute a cost function defined in the quantum approximate optimization algorithm, the cost function being associated with a maximum cut problem, wherein the ZZ coupling is activated by allowing the pair of qubit devices to evolve under a natural Hamiltonian for a time period $\tau$; and
  measuring one or more of the pair of qubit devices to obtain an output from the execution of the quantum approximate optimization algorithm; and
 receiving, from the computing system and in response to the initiating, data based on the output from the execution.

16. The method of claim 15, wherein the execution is initiated by a remote device that operates remote from the computing system.

17. The method of claim 16, wherein the remote device initiates the execution and receives the output by communicating with the computing system over a communication network.

18. The method of claim 15, wherein the execution is initiated by a local device associated with the control system.

19. A method comprising:
 identifying a graph structure associated with a maximum cut problem, the graph structure comprising vertices connected by edges;
 providing a quantum processor designed to have connections based on the graph structure, the connections in the quantum processor connecting respective pairs of qubit devices in the quantum processor, each connection configured to provide coupling between the pair of qubit devices that it connects; and
 configuring a control system to activate a ZZ coupling between each of the respective pairs of qubit devices to execute a cost function defined in a quantum approximate optimization algorithm, the cost function being associated with the maximum cut problem.

20. The method of claim 19, further comprising manufacturing the quantum processor having the connections.

21. The method of claim 19, wherein the qubit devices are superconducting qubit devices, and the connections are capacitive connections.

22. The method of claim 21, wherein each pair of qubit devices includes at least one transmon device.

23. The method of claim 19, wherein the connections in the quantum processor define a qubit connectivity structure that matches the graph structure of the maximum cut problem.

24. The method of claim 19, wherein the connections in the quantum processor define a qubit connectivity structure that does not match the graph structure of the maximum cut problem.

* * * * *

UNITED STATES PATENT AND TRADEMARK OFFICE
CERTIFICATE OF CORRECTION

PATENT NO. : 11,120,357 B2  Page 1 of 1
APPLICATION NO. : 15/914662
DATED : September 14, 2021
INVENTOR(S) : William J. Zeng et al.

It is certified that error appears in the above-identified patent and that said Letters Patent is hereby corrected as shown below:

In the Specification

Column 4, Line 40, Delete "110." and insert -- 100. -- therefor

Column 8, Line 36, Delete " $|\psi_F(\vec{\beta}, \vec{\gamma}))$. " and insert -- $|\psi_F(\vec{\beta},\vec{\gamma})\rangle.$ -- therefor Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*